United States Patent [19]
Yokoyama

[11] Patent Number: 4,885,127
[45] Date of Patent: Dec. 5, 1989

[54] NUCLEAR FUEL ROD SUPPORT GRID WITH ATTACHABLE SPRING AND DIMPLE SUPPORT SPACERS

[75] Inventor: Bungo Yokoyama, Tokaimura, Japan

[73] Assignee: Westinghouse Electric Corp., Pittsburgh, Pa.

[21] Appl. No.: 186,274

[22] Filed: Apr. 26, 1988

[30] Foreign Application Priority Data

Apr. 30, 1987 [JP] Japan ................. 62-107283

[51] Int. Cl.$^4$ .............................................. G21C 3/34
[52] U.S. Cl. ..................... 376/462; 376/441
[58] Field of Search ................. 376/441, 442, 462

[56] References Cited

U.S. PATENT DOCUMENTS

| | | | |
|---|---|---|---|
| 3,431,171 | 3/1969 | Glandin | 376/441 |
| 3,769,159 | 10/1973 | Zinn et al. | 376/441 |
| 3,944,467 | 3/1976 | Biermann et al. | 376/442 |
| 4,297,170 | 10/1981 | Leclercq | 376/442 |
| 4,364,902 | 12/1982 | Feutrel | 376/441 |
| 4,411,862 | 10/1983 | Leclercq et al. | 376/442 |
| 4,492,844 | 1/1985 | Kobuck et al. | 376/438 |
| 4,578,240 | 3/1986 | Cadwell | 376/441 |
| 4,666,663 | 5/1987 | Steinke | 376/441 |

*Primary Examiner*—Daniel Wasil

[57] ABSTRACT

A nuclear fuel rod support grid has a plurality of straps being interleaved with one another to form a matrix of hollow cells. Each cell receives one fuel rod and is defined by intersecting pairs of opposing wall portions of the straps which are shared with adjacent cells. A plurality of fuel rod engaging and clamping springs and dimples are associated with the wall portions of the straps and protrude into the cells so as to clamp a fuel rod therebetween. A pair of spacers separate from the grid straps but detachably mounted to the wall portions thereof defining each cell are installed in each cell along the strap walls portions defining each cell and at a pair of diagonal opposite corners of the cell. Each spacer has a right angle configuration in cross section for fitting into the respective one cell corner. One spacer supports the springs and the other spacer supports the dimples.

23 Claims, 4 Drawing Sheets

NUCLEAR FUEL ROD SUPPORT GRID WITH ATTACHABLE SPRING AND DIMPLE SUPPORT SPACERS

BACKGROUND OF THE INVENTION

1. Field of the Invention The present invention relates generally to nuclear fuel assemblies for nuclear reactors and, more particularly, is concerned with a nuclear fuel rod support grid employing separate attachable spring and dimple support spacers and a method of assembling a nuclear fuel assembly.

2. Description of the Prior Art In most nuclear reactors, the reactor core is comprised of a large number of elongated nuclear fuel assemblies. Conventional designs of these fuel assemblies include a plurality of nuclear fuel rods held in an organized array by a plurality of grids spaced axially along the fuel assembly length and attached to a plurality of elongated control rod guide thimbles of the fuel assembly. Top and bottom nozzles on opposite ends of the fuel assembly are secured to the guide thimbles which extend slightly above and below the ends of the fuel rods.

The grids of the fuel assembly as well know in the art are used to precisely maintain the spacing between the nuclear fuel rods in the reactor core, prevent rod vibration, provide lateral support for the fuel rods, and, to some extent, frictionally clamp and retain the rods against longitudinal movement.

One popular conventional fuel rod support grid design, being illustrated and described in U.S. Pat. No. 4,492,844 to Kobuck et al, includes a multiplicity of interleaved inner and outer belt-shaped straps having an egg-crate configuration forming a multiplicity of cells which individually accept the nuclear fuel rods and control rod guide thimbles. The cells of each grid which accept and support the fuel rods at a given axial location therealong typically use relatively resilient springs and/or relatively rigid protrusions (called dimples) formed directly into the metal of the interleaved straps. The springs and dimples of each grid cell frictionally engage or contact the respective fuel rod extending through the cell and together apply a clamping force directed generally perpendicular to the axial direction of the fuel rod. Additionally, the outer straps are attached together and peripherally enclose the inner straps to impart strength and rigidity to the grid.

However, several drawbacks arise from this particular grid design. Scratches are generated in the axial direction on the outer surfaces of the fuel rods by the springs and dimples when the fuel rods are inserted into the grid cells at the time of assembling of the fuel assembly. Also, when the fuel rods are inserted through the grid cells in assembling the fuel assembly, considerable pushing (or pulling) force is required since the fuel rods are being moved while clamped between the springs and dimples. Further, the fabrication of the straps for the grid with springs and dimples formed thereon is complicated.

Consequently, a need exists for an alternative approach to constructing the fuel rod support grid and assembling the nuclear fuel assembly which will avoid the above drawbacks without presenting new ones in their place.

SUMMARY OF THE INVENTION

The present invention provides a fuel rod support grid with separate attachable spring and dimple support spacers and a method of assembling the fuel assembly designed to satisfy the aforementioned needs. The occurrence of scratches experienced with prior art grids is substantially avoided by the provision of the separate attachable spring and dimple support spacers of the present invention since the fuel rods can now be inserted through the grid cells before the spring and dimple support spacers are installed into the grid cells and attachably mounted to portions of the interleaved grid straps defining the walls of the grid cells.

Accordingly, the present invention is directed to a nuclear fuel rod support grid which comprises: (a) a plurality of straps being interleaved with one another to form a matrix of hollow cells, each cell for receiving one fuel rod and being defined by intersecting pairs of opposing wall portions of the straps which wall portions are shared with adjacent cells; (b) a plurality of fuel rod clamping springs and dimples being associated with the wall portions of the straps defining each cell and protruding into the cell so as to clamp a fuel rod therebetween; and (c) at least one spacer supporting some of springs and dimples being separate from and detachably mounted on some of the wall portions of the straps defining each cell.

More particularly, the spacer is L-shaped in cross section being made from a metal plate that is bent into a ninety-degree configuration. Thus, the spacer is formed of a pair of parts being disposed generally perpendicular to each other and integrally connected together at their inner edges. Each spacer part has a height approximately identical to the height of each of the strap wall portions defining each cell and a width about equal to one-half of the width of each of the strap wall portions defining each cell. The spacer is lodged in a corner of each cell formed by one intersecting pair of the strap wall portions.

Still further, the spacer at a central region of the parts thereof adjacent to opposite unconnected outer edges of the parts has one of either one spring or a pair of the dimples formed in the spacer part so as to protrude therefrom into each cell. Further, if the spacer has the dimples formed therein, they are formed at upper and lower corner regions of each part thereof adjacent to its outer unconnected edge.

Also, the spacer at a central region of each of the parts thereof adjacent to respective upper and lower opposite edges of the parts has attachment tabs of a pair thereof formed thereon so as to project outwardly therefrom. The upper tabs extend generally perpendicular to the spacer parts, whereas the lower tabs extend generally within a plane of the spacer parts.

The present invention also is directed to a nuclear fuel rod support grid which comprises: (a) a plurality of straps being interleaved with one another to form a matrix of hollow cells, each cell for receiving one fuel rod and being defined by intersecting pairs of opposing wall portions of the straps which wall portions are shared with adjacent cells; (b) a plurality of fuel rod clamping springs and dimples being associated with the wall portions of the straps defining each cell and protruding into the cell so as to clamp a fuel rod therebetween; and (c) a pair of spacers inserted in each cell along the strap walls portions defining each cell, one of the spacers supporting the springs and the other of the spacers supporting the dimples, the spacers being separate from and detachably mounted on the wall portions of the straps defining each cell.

Further, the present invention is directed to a method of assembling a fuel assembly which comprises the steps of: (a) positioning, relative to one another and separated by a set distance, support grids of a plurality thereof being composed of interleaved straps defining a multiplicity of cells, the grids being positioned with their cells in longitudinal alignment; (b) inserting guide thimbles of a plurality thereof through a plurality of predetermined spaced ones of the aligned grid cells; (c) attaching a bottom nozzle to lower ends of the guide thimbles; (d) inserting fuel rods in a plurality thereof in a predetermined sequential manner through the grids cells unoccupied by guide thimbles; (e) alternately with the inserting of the fuel rods, installing spacers having fuel rod engaging and clamping elements thereon in the grid cells which have fuel rods inserted therethrough; and (f) once the inserting of fuel rods and installing of fuel rod clamping spacers is completed, attaching a top nozzle to upper ends of the guide thimbles.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
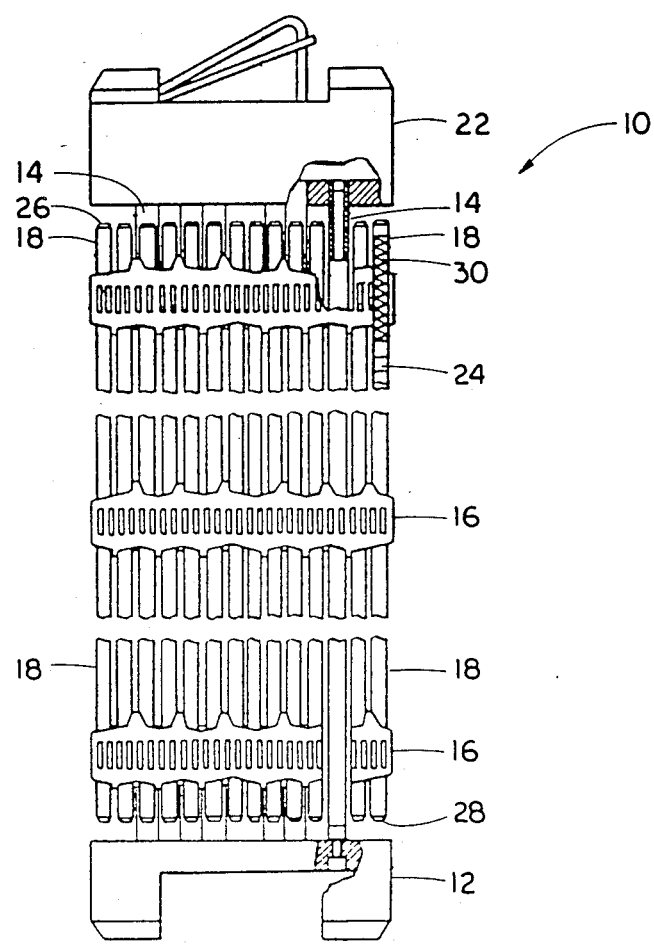
FIG. 1 is an elevational view, partly in section, of a fuel assembly employing a plurality of prior art fuel rod support grids, the assembly being illustrated in vertically foreshortened form with parts broken away for clarity.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Referring now to the drawings, and particularly to FIG. 1, there is shown an elevational view of a fuel assembly, represented in vertically foreshortened form and being generally designated by the numeral 10. The fuel assembly 10 is the type used in a pressurized water reactor (PWR) and basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse fuel rod support grids 16 constructed in accordance with the principles of the present invention, as will be described in detail below. The grids 16 are axially spaced along and supported by the guide thimbles 14. The assembly 10 also includes a plurality of elongated fuel rods 18 transversely spaced and supported in an organized array by the grids 16. Also, the assembly 10 has an instrumentation tube 20 located in the center thereof and an upper end structure or top nozzle 22 attached to the upper ends of the guide thimbles 14. With such arrangement of parts, the fuel assembly 10 forms an integral unit capable of being conveniently handled without damaging the assembly parts.

As mentioned above, the fuel rods 18 in the array thereof in the assembly 10 are held in spaced relationship with one another by the support grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the PWR. A liquid moderator/coolant such as water, or water containing boron, is pumped upwardly through the fuel assemblies of the core is order to extract heat generated therein for the production of useful work.

To control the fission process, a number of control rods (not shown) are reciprocally movable in the guide thimbles 14 located at predetermined positions in the fuel assembly 10. Specifically, the top nozzle 22 has associated therewith a rod cluster mechanism (not shown) with a plurality of radially extending arms (not shown). Each arm is interconnected to a control rod such that the control mechanism is operable to move the control rods vertically in the guide thimbles 14 to thereby control the fission process in the fuel assembly 10, all in a well-known manner.

Figure 2:
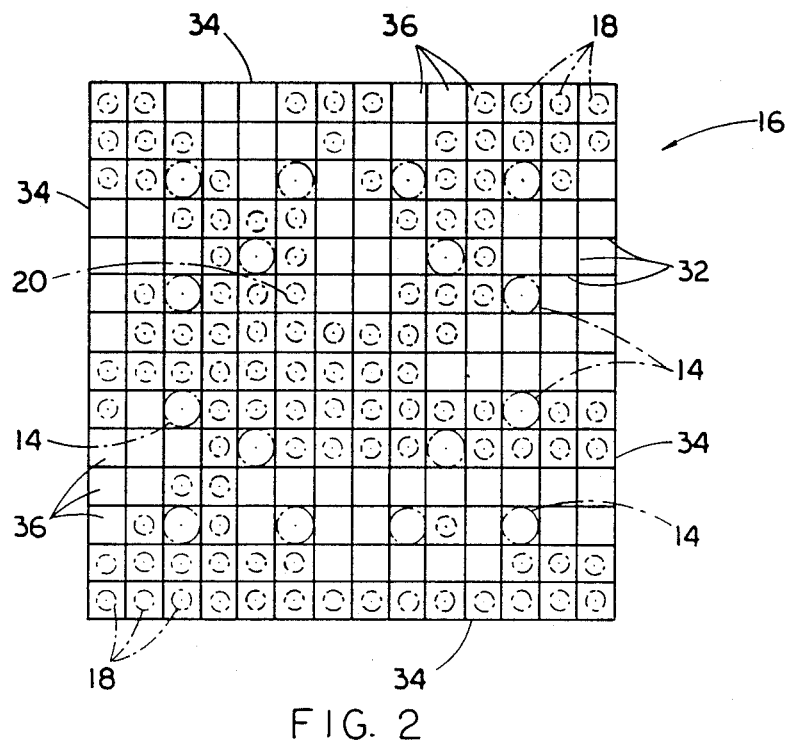
FIG. 2 is an enlarged plan view of one of the prior art support grids of the fuel assembly of FIG. 1.
Figure 3:
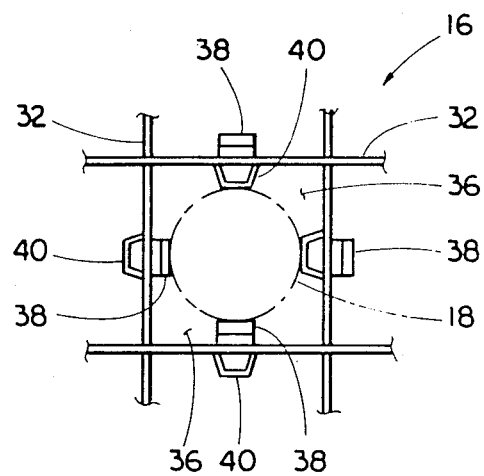
FIG. 3 is an enlarged fragmentary top plan view of the prior art support grid of FIG. 2, illustrating portions of interleaved grid straps defining one cell of the support grid.

Referring to FIGS. 2 and 3, each fuel rod support grid 16 includes a multiplicity of interleaved inner and outer belt-shaped straps 32,34. The outer straps 34 are attached together and peripherally enclose the inner straps 32 to impart strength and rigidity to the grid 16 and provide it with a lattice or egg-crate configuration forming a multiplicity of lattice spaces or cells 36 which individually accept the nuclear fuel rods 18 and control rod guide thimbles 14. The cells 36 of each grid 16 which accept and support the fuel rods 18 at a given axial location therealong typically use relatively resilient springs 38 and relatively rigid protrusions or dimples 40 formed directly into the metal of the interleaved straps 32,34. The springs 38 and dimples 40 of each grid cell 16 protrude into the cell and frictionally engage or contact the respective fuel rod 18 extending through the cell and together apply a clamping force directed generally perpendicular to the axial direction of the fuel rod 18.

In view of the above-described construction of the fuel rod support grid 16, it will be readily appreciated that scratches can be generated in the axial direction on the outer surface of a fuel rod 18 by the springs 38 and dimples 40 as the fuel rod 18 is inserted through a respective one grid cell 36 at the time of assembling of the fuel assembly 10. Also, when the fuel rods 18 are inserted through the cells 36, a considerable pushing or pulling force is required since the fuel rods are being moved while clamped by the springs 38 and dimples 40. The present invention described hereafter provides a grid construction which avoids these problems.

Grids With Spring And Dimple Support Spacers

Referring now to FIGS. 4 to 7, there is shown in fragmentary form a fuel rod support grid 42 constructed in accordance with the principles of the present invention. Like the prior art grid 16 of FIGS. 1 to 3, the support grid 42 has a plurality of interleaved inner straps 44 surrounded and interconnected by outer straps (not shown) to form a multiplicity or matrix of lattice spaces or hollow cells 46 defined by wall portions 44A,44B of the straps which individually accept the fuel rods 18 and guide thimbles 14 therethrough. However, in the case of the straps 44 of the grid 42 the structures (i.e., springs and dimples) for supporting and clamping the fuel rods 18 are not formed directly into the metal of the interleaved straps 44.

Figure 4:
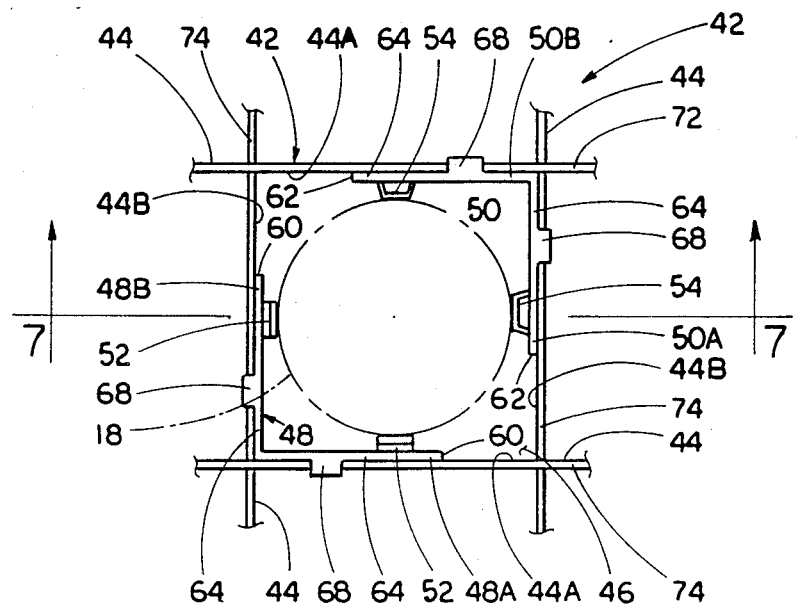
FIG. 4 is a view similar to that of FIG. 3, but illustrating a cell of a fuel rod support grid employing separate attachable spring and dimple support spacers in accordance with the principles of the present invention.
Figure 5:
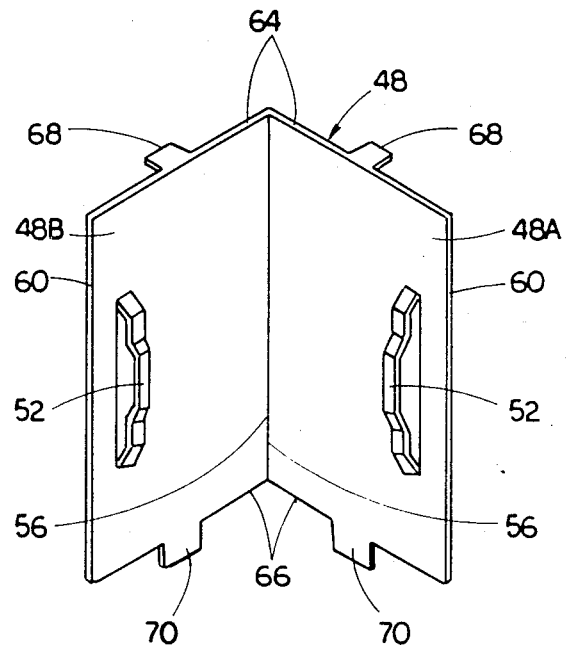
FIG. 5 is a perspective view of a spring support spacer employed in the cell of the support grid of FIG. 4.
Figure 7:
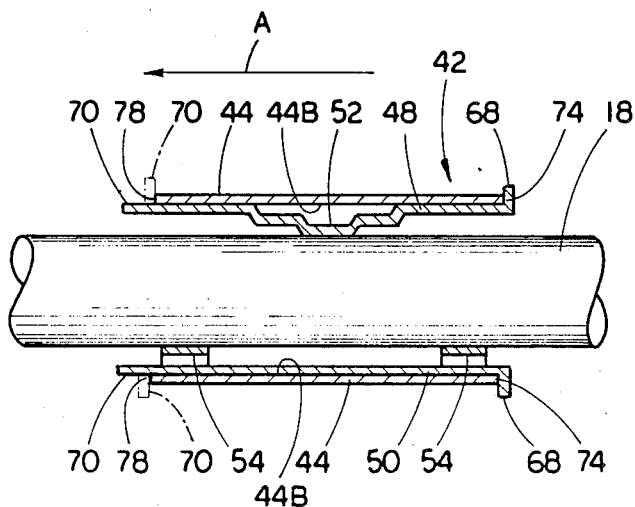
FIG. 7 is a fragmentary longitudinal axial sectional view of the support grid and spring and dimple spacers, on a smaller scale, as taken along line 7--7 of FIG. 4 and rotated clockwise ninety degrees.
Figure 6:
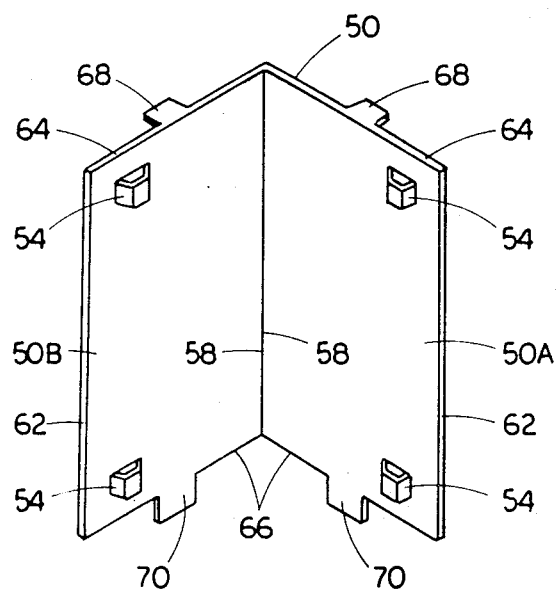
FIG. 6 is a perspective view of a dimple support spacer employed in the cell of the support grid of FIG. 4.

As illustrated in FIGS. 4 and 7, and particularly in FIGS. 5 and 6, the fuel rod support grid 42 employs separate spacers 48,50 which have respective springs 52 and dimples 54 for each grid cell 46 formed directly in the metal of the spacers 48,50. A set or pair of the separate spacers 48,50 are insertable within a respective one cell 46 as best seen in FIG. 4 and detachably attachable to the wall portions 44A,44B of the grid straps 44 defining the one cell 46 after insertion of the respective fuel rod 18 through the particular cell.

More particularly, the spring support spacer 48 and dimple support spacer 50 each is L-shaped in cross section made from a metal plate that is bent into a ninety-degree configuration. The two parts 48A,48B and 50A,50B of the spacers 48,50 are thus disposed perpendicular to each other and integrally connected together at their inner edges 56,58. Each part is of a height approximately identical to the height of the strap wall portions 44A,44B defining the one cell 46 and of a width approximately one-half of the width of the wall portions. The height of each part 48A,48B and 50A,50B of the spacers 48,50 refers to the dimension between its upper and lower opposite edges 64,66. The height of each strap wall portion 44A,44B refers to the dimension between its upper edges 72,74 and lower edges 76,78. The widths of each part and each strap wall portion refer to the dimensions oriented perpendicular to their height dimensions. When installed in the grid cell 46, the spring support spacer 48 is lodged in one corner formed by one pair of intersecting strap wall portions 44A,44B and the dimple support spacer 50 is lodged in a diagonally opposite corner formed by another pair of intersecting strap wall portions 44A,44B.

At the central region of the each spacer part 48A,48B adjacent to its outer unconnected edge 60, one spring 52 is formed in the part of the spacer so as to protrude therefrom. At upper and lower corner regions of each spacer part 50A,50B adjacent to its outer unconnected edge 62, a pair of dimples 54 are formed in the part of the spacer so as to protrude therefrom. Also, at the central region of each spacer part 48A,48B and 50A,50B of the spacers 48,50 adjacent to its upper and lower opposite edges 64,66, a pair of short attachment tabs 68,70 are integrally formed so as to project outwardly therefrom. The upper tabs 68 extend perpendicular to the spacer parts, whereas the lower tabs 70 extend within the plane of the spacer parts.

As shown in FIG. 7, one each of the spacers 48,50 of the construction described above is inserted along the faces of the wall portions 44A,44B of one respective cell 46 from the lower edges 66 of the spacers having the lower tabs 70 thereon. The spacers 48,50 are inserted until the bent upper tabs 68 are brought into abutment with the upper edges 72,74 of the straps wall portions 44A,44B. Once installed, the lower tabs 70 are bent toward the wall portions 44A,44B and under the lower edges 76,78 thereof to the dotted positions seen in FIG. 7. Once the spacers 48,50 are installed in the grid cell 46, their springs and dimples 52,54 cooperate to engage opposite quadrants of the fuel rod 18 and clamp the fuel rod therebetween. It is readily apparent that the spacers 48,50 can be detached and dismounted form the straps 48,50 by reverse bending the lower tabs 70 and withdrawing the spacers from the cells 46.

In assembling the fuel assembly 10 in accordance with the present invention so as to employ the fuel rod support grids 42, first, the necessary number of support grids required for the fuel assembly are positioned and separated by a set distance. The guide thimbles 14 are next inserted through predetermined spaced ones of the grid cells 46 and the bottom nozzle 12 is fixed at the lower ends of the guide thimbles Then, the fuel rods 18 are inserted in some predetermined sequence, such as a row at a time, through the grids 42. After one row of fuel rods 18 have been inserted, the spring and dimple support spacers 48,50 are installed in the direction of arrow A in FIG. 7 and the lower attachment tabs 70 bent under the strap wall portion lower edges 76,78. When the insertion and fixing of the fuel rods 18 and spacers 48,50 in the grids 42 are completed, the assembling of the fuel assembly is finished by fixing the top nozzle 22 to the upper ends of the guide thimbles 14.

By using the above assembling method, the occurrence of scratches on the outer surfaces of the fuel rods 18 is prevented by inserting the fuel rods before the spacers 48,50. Once the spacers 48,50 are inserted into the cells 46 after the insertion of the fuel rods and attached to the strap wall portions 44A,44B, their springs 52 and dimples 54 clamp the fuel rods 18 therebetween. Also when inserting the fuel rods 18 into the grid cells 46, since the fuel rods do not touch the springs 52 and dimples 54 as in the conventional method, the pushing in (or pulling out) force for the fuel rods can be reduced. Further, there is no need to form the springs 52 and dimples 54 on the straps 44 so the fabrication of the straps becomes easier.

Although in the above embodiments of the spacers 48,50, both the springs 52 and dimples 54 are formed on the respective spacers. Alternatively, only the springs 52 that mostly cause the scratch generation may be formed on spacer 48 and the other dimples 54 may be directly formed on the straps 44. In the latter instance, the fuel rods 18 are inserted into the grid cells 46 without touching the dimples 54. Then, the spring support spacers 48 are inserted into the cells and affixed thereto, thereby clamping the fuel rods with the dimples. In such manner, generation of scratches on the outer surface of the fuel rods 18 are also prevented. Similarly, insertion forces are reduced and fabrication of the straps, but now only without springs, is made somewhat easier.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. A nuclear fuel rod support grid, comprising:
   (a) a plurality of straps being interleaved with one another to form a matrix of hollow cells, each cell for receiving one fuel rod and being defined by intersecting pairs of opposing wall portions of said straps which wall portions are shared with adjacent cells;
   (b) a plurality of fuel rod clamping springs and dimples being associated with said wall portions of said straps defining each cell and protruding into said cell so as to clamp a fuel rod therebetween; and
   (c) at least one spacer supporting some of said springs and dimples being separate from and detachably mounted on some of said wall portions of said straps defining each said cell;
   (d) said spacer being L-shaped in cross-section and made from a metal plate that is bent into a ninety-degree configuration to form a pair of parts disposed generally perpendicular to each other and integrally connected together at their inner edges, each spacer part having a height approximately identical to the height of each of said strap wall portion defining each said cell;
   (e) said spacer being lodged in a corner of each said cell formed by one intersecting pair of said strap wall portions with said pair of parts of said spacer extending along said wall portions forming said corner.

2. The grid as recited in claim 1, wherein each spacer part has a width approximately equal to one-half of the width of each of said strap wall portions defining each said cell.

3. The grid as recited in claim 1, wherein said spacer at a central region of each of said parts thereof adjacent to opposite unconnected outer edges of said parts has one of either one said spring or a pair of said dimples formed in said spacer part so as to protrude therefrom into each said cell.

4. The grid as recited in claim 3, wherein said spacer has said dimples formed therein at upper and lower corner regions of each said part thereof adjacent to its outer unconnected edge.

5. The grid as recited in claim 1, wherein said spacer at a central region of each of said parts thereof adjacent to respective upper and lower opposite edges of said parts has attachment tabs of a pair thereof formed thereon so as to project outwardly therefrom.

6. The grid as recited in claim 5, wherein said upper tabs extend generally perpendicular to said spacer parts, whereas said lower tabs extend generally within a plane of said spacer parts.

7. A nuclear fuel rod support grid, comprising:
   (a) a plurality of straps being interleaved with one another to form a matrix of hollow cells, each cell for receiving one fuel rod and being defined by intersecting pairs of opposing wall portions of said straps which wall portions are shared with adjacent cells;
   (b) a plurality of fuel rod clamping springs and dimples being associated with said wall portions of said straps defining each cell and protruding into said cell so as to clamp a fuel rod therebetween; and
   (c) a pair of spacers inserted in each said cell along said strap walls portions defining each said cell, one of said spacers supporting said springs and the other of said spacers supporting said dimples, said spacers being separate from and detachably mounted on said wall portions of said straps defining each said cell;
   (d) each said spacer being L-shaped in cross section and made from a metal plate that is bent into a ninety-degree configuration to form a pair of parts disposed generally perpendicular to each other and integrally connected together at their inner edges, each part having a height approximately identical to the height of each of said strap wall portions defining each said cell;
   (e) one of said spacers being lodged in one corner of each said cell formed by one intersecting pair of said strap wall portions with said pair of parts of said one spacer extending along said wall portions forming said one corner;
   (f) the other of said spacers being lodged in a diagonal opposite corner of each said cell formed by the other intersecting pair of said strap wall portions with said pair of parts of said other spacer extending along said wall portions forming said diagonal opposite corner.

8. The grid as recited in claim 7, wherein each part has a width approximately equal to one-half of the width of each of said strap wall portions defining each said cell.

9. The grid as recited in claim 7, wherein one of said spacers at a central region of each of said parts thereof adjacent to opposite unconnected outer edges of said parts has said spring formed in said spacer part so as to protrude therefrom into each said cell, whereas the other of said spacers at a central region of each of said parts thereof adjacent to opposite outer upper and lower corners at intersections of said upper edges of said parts with upper and lower edges thereof has dimples of a pair thereof formed in said spacer part so as to protrude therefrom into each said cell.

10. The grid as recited in claim 7, wherein each said spacer at a central region of each of said parts thereof adjacent to respective upper and lower opposite edges of said parts has attachment tabs of a pair thereof formed thereon so as to project outwardly therefrom.

11. The grid as recited in claim 10, wherein said upper tabs extend generally perpendicular to said spacer parts, whereas said lower tabs extend generally within a plane of said spacer parts.

12. A nuclear fuel rod support grid, comprising:
   (a) a plurality of straps being interleaved with one another to form a matrix of hollow cells, each cell for receiving one fuel rod and being defined by intersecting pairs of opposing wall portions of said straps which wall portions are shared with adjacent cells;

(b) a plurality of fuel rod clamping springs and dimples being associated with said wall portions of said straps defining each cell and protruding into said cell so as to clamp a fuel rod therebetween; and (c) at least one spacer supporting some of said springs and dimples being separate from and detachably mounted on some of said wall portions of said straps defining each said cell;

(d) said spacer being formed of a pair of parts disposed generally perpendicular to each other and integrally connected together at their inner edges;

(e) said spacer being lodged in a corner of each said cell formed by one intersecting pair of said strap wall portions with said pair of parts of said spacer extending along said wall portions forming said corner;

(f) said spacer at a central region of each of said parts thereof adjacent to opposite unconnected outer edges of said parts having one of either one said spring or a pair of said dimples formed in said spacer part so as to protrude therefrom into each said cell;

(g) said spacer having said dimples formed therein at upper and lower corner regions of each said part thereof adjacent to its outer unconnected edge.

13. The grid as recited in claim 12, wherein said spacer is L-shaped in cross section being made from a metal plate that is bent into a ninety-degree configuration.

14. The grid as recited in claim 12, wherein each spacer part has a height approximately identical to the height of each of said strap wall portions defining each said cell.

15. The grid as recited in claim 14, wherein each spacer part has a width approximately equal to one-half of the width of each of said strap wall portions defining each said cell.

16. The grid as recited in claim 12, wherein said spacer at said central region of each of said parts thereof adjacent to respective upper and lower opposite edges of said parts has attachment tabs of a pair thereof formed thereon so as to project outwardly therefrom.

17. The grid as recited in claim 16, wherein said upper tabs extend generally perpendicular to said spacer parts, whereas said lower tabs extend generally within a plane of said spacer parts.

18. A nuclear fuel rod support grid, comprising:
(a) a plurality of straps being interleaved with one another to form a matrix of hollow cells, each cell for receiving one fuel rod and being defined by intersecting pairs of opposing wall portions of said straps which wall portions are shared with adjacent cells;
(b) a plurality of fuel rod clamping springs and dimples being associated with said wall portions of said straps defining each cell and protruding into said cell so as to clamp a fuel rod therebetween; and
(c) a pair of spacers inserted in each said cell along said strap walls portions defining each said cell, one of said spacers supporting said springs and the other of said spacers supporting said dimples, said spacers being separate from and detachably mounted on said wall portions of said straps defining each said cell;
(d) each said spacer being formed of a pair of parts disposed generally perpendicular to each other and integrally connected together at their inner edges;
(e) one of said spacers being lodged in one corner of each said cell formed by one intersecting pair of said strap wall portions with said pair of parts of said one spacer extending along said wall portions forming said one corner;
(f) the other of said spacers being lodged in a diagonal opposite corner of each said cell formed by the other intersecting pair of said strap wall portions with said pair of parts of said other spacer extending along said wall portions forming said diagonal opposite corner;
(g) one of said spacers at a central region of each of said parts thereof adjacent to opposite unconnected outer edges of said parts having said spring formed in said spacer part so as to protrude therefrom into each said cell, whereas the other of said spacers at a central region of each of said parts thereof adjacent to opposite outer upper and lower corners at intersections of said upper edge of said parts with upper and lower edges thereof having dimples of a pair thereof formed in said spacer part so as to protrude therefrom into each said cell.

19. The grid as recited in claim 18, wherein each said spacer is L-shaped in cross section being made from a metal plate that is bent into a ninety-degree configuration.

20. The grid as recited in claim 18, wherein each part has a height approximately identical to the height of each of said strap wall portions defining each said cell.

21. The grid as recited in claim 20, wherein each part has a width approximately equal to one-half of the width of each of said strap wall portions defining each said cell.

22. The grid as recited in claim 18, wherein each spacer at a central region of each of said parts thereof adjacent to respective upper and lower opposite edges of said parts has attachment tabs of a pair thereof formed thereon so as to project outwardly therefrom.

23. The grid as recited in claim 22, wherein said upper tabs extend generally perpendicular to said spacer parts, whereas said lower tabs extend generally within a plane of said spacer parts.

* * * * *